United States Patent [19]

Eichenauer et al.

[11] Patent Number: 5,674,940
[45] Date of Patent: Oct. 7, 1997

[54] ABS MOLDING COMPOUNDS WITH IMPROVED TOUGHNESS

[75] Inventors: Herbert Eichenauer; Ulrich Jansen, both of Dormagen; Karl-Erwin Piejko, Bergisch Gladbach, all of Germany

[73] Assignee: Bayer AG, Leverkusen, Germany

[21] Appl. No.: 660,467

[22] Filed: Jun. 7, 1996

Related U.S. Application Data

[63] Continuation of Ser. No. 424,657, Apr. 19, 1995, abandoned.

[30] Foreign Application Priority Data

Apr. 22, 1994 [DE] Germany ............... 44 14 124.6

[51] Int. Cl.$^6$ .................. C08L 55/02; C08L 51/04
[52] U.S. Cl. .................. 525/71; 525/73; 525/80; 525/84
[58] Field of Search .................. 525/71, 73, 80; 524/505, 501

[56] References Cited

U.S. PATENT DOCUMENTS

| | | | |
|---|---|---|---|
| 3,509,238 | 4/1970 | Aubrey et al. | 525/71 |
| 3,928,494 | 12/1975 | Alberti | 525/71 |
| 4,520,165 | 5/1985 | Zabrocki et al. | 525/84 |
| 4,767,833 | 8/1988 | Yomoto et al. | 525/193 |

FOREIGN PATENT DOCUMENTS

| | | |
|---|---|---|
| 0 116 330 | 1/1984 | European Pat. Off. |
| 253 236 | 1/1988 | European Pat. Off. |
| 71 615 | 3/1968 | Germany. |
| 1 469 844 | 12/1968 | Germany. |
| 18 13 719 | 7/1969 | Germany. |
| 3 640 337 | 6/1988 | Germany. |
| 1 235 346 | 6/1971 | United Kingdom. |

*Primary Examiner*—Mark L. Warzel
*Attorney, Agent, or Firm*—Connolly and Hutz

[57] ABSTRACT

Thermoplastic molding compounds of the ABS type of

A) at least one graft polymer obtainable by emulsion polymerization of styrene and acrylonitrile in a ratio by weight of 90:10 to 50:50, the styrene and/or acrylonitrile being completely or partly replaceable by α-methyl styrene, methyl methacrylate or N-phenyl maleic imide, in the presence of at least two butadiene polymer latices of type (A) and (B), of which each contains 0 to 50% by weight of another vinyl monomer in copolymerized form, the ratio by weight of the monomers used to the butadiene polymers used being 25:75 to 70:30, and B) at least one copolymer of styrene and acrylonitrile in a ratio by weight of 90:10 to 50:50, the styrene and/or acrylonitrile being completely or partly replaceable by α-methyl styrene, methyl methacrylate or N-phenyl maleic imide, characterized in that the butadiene polymer latex (A) has a particle diameter $d_{50}$ of ≦250 nm, a width of the particle size distribution (measured as $d_{90}$–$d_{10}$ from the integral particle size distribution) of 500 to 1000 nm and a gel content of ≦70% by weight, the butadiene polymer latex (B) has a particle diameter $d_{50}$ of ≧300 nm, a width of the particle size distribution (measured as $d_{90}$–$d_{10}$ from the integral particle size distribution) of 50 to 500 nm and a gel content of ≧70% by weight and the graft polymerization is carried out by addition of the monomers to the mixture of butadiene polymer latices (A) and (B) in such a way that 55 to 90% by weight of the monomers are added in the first half of the monomer addition time.

3 Claims, No Drawings

ABS MOLDING COMPOUNDS WITH IMPROVED TOUGHNESS

This application is a continuation of application Ser. No. 08/424,657 filed on Apr. 4, 1995, now abandoned.

This invention relates to thermoplastic molding compounds of the ABS type produced in emulsion with improved properties in relation to known ABS molding compounds, more particularly high toughness, ready processability and good surface gloss.

ABS molding compounds are two-phase plastics of:

I. a thermoplastic copolymer of styrene and acrylonitrile in which the styrene can be completely or partly replaced by α-methyl styrene or methyl methacrylate; this copolymer, which is also known as SAN resin or matrix resin, forms the outer phase;

II. at least one graft polymer which has been produced by grafting of one or more of the monomers mentioned in I. onto butadiene homopolymer or copolymer ("graft base"). This graft polymer ("elastomer phase" or "graft rubber") forms the disperse phase in the matrix resin.

Given the same matrix, the toughness of an ABS molding compound is essentially determined by the graft rubber. However, the toughness which can be achieved with conventional ABS molding compounds is not always sufficient with the necessary dependability for heavily stressed moldings. Accordingly, there is a need for graft rubbers on the basis of which it would be possible to produce ABS molding compounds with increased toughness without any deterioration in other properties, such as processability and surface gloss.

DE-AS 1 813 719 describes tough, readily processable ABS molding compounds which are obtained by the single-stage emulsion graft polymerization under pressure of 75 to 90 parts by weight of a monomer mixture onto 10 to 25 parts by weight of a mixture of two rubber latices, of which one is a pure polybutadiene and the other an SBR latex with a styrene content of <50% and a certain particle size.

U.S. Pat. No. 3,509,238 describes ABS products produced using two graft polymers of which one is lightly grafted and the other heavily grafted. Unfortunately, these products shown unsatisfactory properties at low temperatures.

U.S. Pat. No. 3,928,494 describes ABS products with two graft polymers grafted to different degrees, in which the more lightly grafted fine-particle material agglomerates into particle aggregates during spray drying or coagulation. The aggregates thus formed are loosely bound structures which can be torn apart again on exposure to high temperatures and shear forces, such as can occur for example in injection molding, and then lead to inadequate product toughness values.

EP-A 116 330 describes ABS molding compounds based on two different butadiene polymers with a special interval between graft sites in the graft polymers produced from the butadiene polymers. Although these products show high toughness at room temperature, the values for toughness at low temperatures and surface gloss are not good enough to meet exacting requirements.

It has now been found that ABS molding compounds which combine high impact strength values with good surface gloss can be obtained by using a mixture of carefully defined rubber latices and by applying special reaction conditions in the production of the graft rubber.

The present invention relates to thermoplastic molding compounds of the ABS type of A) at least one graft polymer obtainable by emulsion polymerization of styrene and acrylonitrile in a ratio by weight of 90:10 to 50:50, the styrene and/or acrylonitrile being completely or partly replaceable by α-methyl styrene, methyl methacrylate or N-phenyl maleic imide, in the presence of at least two butadiene polymer latices of type (A) and (B), of which each contains 0 to 50% by weight of another vinyl monomer in copolymerized form, the ratio by weight of the monomers used to the butadiene polymers used being 25:75 to 70:30, and B) at least one copolymer of styrene and acrylonitrile in a ratio by weight of 90:10 to 50:50, the styrene and/or acrylonitrile being completely or partly replaceable by α-methyl styrene or methyl methacrylate or N-phenyl maleic imide, characterized in that the butadiene polymer latex (A) has a particle diameter $d_{50}$ of ≦250 nm and preferably from 150 to 250 nm, a width of the particle size distribution (measured as $d_{90}-d_{10}$ from the integral particle size distribution) of 500 to 1000 nm and preferably 700 to 850 nm and a gel content of ≦70% by weight and preferably 50 to 65% by weight, the butadiene polymer latex (B) has a particle diameter $d_{50}$ of ≧300 nm and preferably from 350 to 450 nm, a width of the particle size distribution (measured as $d_{90}-d_{10}$ from the integral particle size distribution) of 50 to 500 nm and preferably 100 to 400 nm and a gel content of ≧70% by weight and preferably 75 to 90% by weight and the graft polymerization is carried out by addition of the monomers to the mixture of butadiene polymer latices (A) and (B) in such a way that 55 to 90% by weight, preferably 60 to 80% by weight and more preferably 65 to 75% by weight of the monomers are added in the first half of the monomer addition time.

A mixture of at least two butadiene polymer latices, one of type (A) and one of type (B), is used for the graft polymerization. The ratio by weight of (A) to (B), based on the particular solids content of the latices, is 90:10 to 10:90 and preferably 60:40 to 30:70.

The butadiene polymer latices (A) and (B) can be prepared by emulsion polymerization of butadiene. This polymerization is known and is described, for example, in Houben-Weyl, Methoden der Organischen Chemie, Makromolekulare Stoffe, Part 1, page 674 (1961), Thieme Verlag Stuttgart. One or more monomers copolymerizable with butadiene may be used as the comonomers in quantities of up to 50% by weight (based on the total quantity of monomer used for the production of the butadiene polymer).

Examples of such monomers are isoprene, chloroprene, acrylonitrile, styrene, α-methyl styrene, $C_{1-4}$ alkyl styrenes, $C_{1-8}$ alkyl acrylates, $C_{1-8}$ alkyl methacrylates, alkylene glycol diacrylates, alkylene glycol dimethacrylates, divinylbenzene; butadiene alone is preferably used. It is also possible initially to produce a fine-particle butadiene polymer by known methods and then to agglomerate it in known manner to establish the necessary particle size. Corresponding techniques are known (cf. EP-PS 0 029 613; EP-PS 0 007 810; DD-PS 144 415, DE-AS 1 233 131; DE-AS 1 258 076; DE-OS 2 101 650; U.S. Pat. No. 1,379,391).

The so-called seed polymerization technique may also be used. In seed polymerization, a fine-particle butadiene polymer is initially prepared and then further polymerized to relatively large particles by further reaction with butadiene-containing monomers.

In principle, the butadiene polymer latices (A) and (B) may also be prepared by emulsification of fine-particle butadiene polymers in aqueous media (cf. Japanese patent application 55 125 102).

The butadiene polymer latex (A) has a mean particle diameter $d_{50}$ of ≦250 nm and preferably 150 to 250 nm, a width of the particle size distribution (measured as $d_{90}-d_{10}$ from the integral particle size distribution) of 500 to 1000 nm and preferably 700 to 850 nm and a gel content of $\leq 70\%$ by weight and preferably 50 to 65% by weight.

The butadiene polymer latex (B) has a mean particle diameter $d_{50}$ of $\geq 300$ nm and preferably 350 to 450 nm, a width of the particle size distribution (measured as $d_{90}-d_{10}$ from the integral particle size distribution) of 50 to 500 nm and preferably 100 to 400 nm and a gel content of $\geq 70\%$ by weight and preferably 75 to 90% by weight.

The mean particle diameter $d_{50}$ and also the $d_{50}$ and $d_{90}$ values may be determined by ultracentrifuge measurement (cf. W. Scholtan, H. Lange: Kolloid Z. u. Z. Polymere 250, pages 782 to 796 (1972)). The values mentioned above for the gel content are determined by the wire cage method in toluene (cf. Houben-Weyl, Methoden der Organischen Chemie, Makromolekulare Stoffe, Part 1, page 307 (1961), Thieme Verlag Stuttgart).

The gel contents of the butadiene polymer latices (A) and (B) may be established in basically known manner by applying suitable reaction conditions (for example a high reaction temperature and/or polymerization to a high conversion and, optionally, addition of crosslinking agents to obtain a high gel content or, for example, a low reaction temperature and/or termination of the polymerization reaction before excessive crosslinking occurs and, optionally, addition of molecular weight regulators such as, for example, n-dodecyl mercaptan or t-dodecyl mercaptan to obtain a low gel content). Suitable emulsifiers are any of the well-known anionic emulsifiers, such as alkylsulfates, alkylsulfonates, aralkylsulfonates, soaps of saturated or unsaturated fatty acids and alkaline disproportionated or hydrogenated abietic or tall oil acids. Emulsifiers containing carboxyl groups (for example salts of $C_{10-18}$ fatty acids, disproportionated abietic acid) are preferably used.

The graft polymerization may be carried out by continuously adding the monomer mixture to the mixture of butadiene polymer latices (A) and (B) and polymerizing the whole.

A special monomer to rubber ratio has to be maintained and a definite procedure adopted for adding the monomer to the rubber latex.

To produce the products according to the invention, 25 to 70 parts by weight and preferably 30 to 60 parts by weight of a mixture of styrene and acrylonitrile, which may optionally contain up to 50% by weight (based on the total quantity of the monomers used in the graft polymerization) of one or more comonomers, are polymerized in the presence of 30 to 75 parts by weight and preferably 40 to 70 parts by weight (based on solids) of the butadiene polymer latex mixture of (A) and (B).

The monomers used in this graft polymerization are preferably mixtures of styrene and acrylonitrile in a ratio by weight of 90:10 to 50:50 and more preferably in a ratio by weight of 65:35 to 75:25, the styrene and/or acrylonitrile being partly replaceable by copolymerizable monomers, preferably by α-methyl styrene, methyl methacrylate or N-phenyl maleic imide.

In addition, molecular weight regulators may be used in the graft polymerization reaction, preferably in quantities of 0.05 to 2% by weight and more preferably in quantities of 0.1 to 1% by weight (based on the total quantity of the monomer in the graft polymerization stage). Suitable molecular weight regulators are, for example, n-dodecyl mercaptan, t-dodecyl mercaptan, dimeric α-methyl styrene.

Suitable initiators are inorganic and organic peroxides, for example $H_2O_2$, ditert.butyl peroxide, cumene hydroperoxide, dicyclohexyl percarbonate, tert.butyl hydroperoxide, p-menthane hydroperoxide; azoinitiators such as, for example, azo-bis-isobutyronitrile; inorganic persalts, such as ammonium, sodium or potassium persulfate, potassium perphosphate, sodium perborate; and redox systems consisting of a generally organic oxidizing agent and a reducing agent, heavy metal ions additionally being present in the reaction medium (see H. Logemann in Houben-Weyl, Methoden der Organischen Chemie, Vol. 14/1, pages 263 to 297).

The reaction temperature is in the range from 25° C. to 160° C. and preferably in the range from 40° C. to 90° C. The compounds mentioned above may be used as emulsifiers.

To produce the products according to the invention, the graft polymerization has to be carried out by addition of the monomers in such a way that 55 to 90% by weight, preferably 60 to 80% by weight and more preferably 65 to 75% by weight of the total monomers to be used in the graft polymerization are added in the first half of the overall monomer addition time; the remaining monomer is added in the second half of the overall monomer addition time.

Finally, the graft polymer thus produced is mixed with at least one thermoplastic vinyl resin. This can be done in various ways. If the vinyl resin itself has been produced by emulsion polymerization, the latices may be mixed and then precipitated and worked up together. If the vinyl resin has been produced by solution or bulk polymerization, the graft polymer has to be isolated by known methods, for example by spray drying or by addition of salts and/or acids, washing of the precipitation products and drying of the powder, and subsequently mixed with the vinyl resin (preferably on multiple-roll stands, mixing extruders or internal kneaders). This method is preferably applied.

Preferred vinyl resins are copolymers of styrene and acrylonitrile in a ratio by weight of 90:10 to 50:50, the styrene and/or acrylonitrile being completely or partly replaceable by α-methyl styrene and/or methyl methacrylate. Up to 30% by weight, based on vinyl resin, of another monomer from the group consisting of maleic anhydride, maleic imide, N-(cyclo)-alkyl maleic imide, N-(alkyl)-phenyl maleic imide may optionally be used.

Particulars of the production of these resins can be found, for example, in DE-AS 2 420 358 and in DE-AS 2 724 60. Vinyl resins produced by bulk or solution polymerization have been particularly successful.

The percentage content of the graft rubber in the molding compounds according to the invention may be varied within wide limits and is preferably in the range from 10 to 80% by weight and more preferably in the range from 20 to 75% by weight.

The necessary additives or useful additives, for example antioxidants, UV stabilizers, peroxide destroyers, antistatic agents, lubricants, mold release agents, flameproofing agents, fillers and reinforcing materials (glass fibers, carbon fibers, etc.), dyes, may be added to the molding compounds according to the invention during their production, working up, further processing and final processing.

The molding compounds according to the invention may be processed in commercially available processing units, for example by injection molding, sheet extrusion optionally followed by hot forming, cold forming, extrusion of tubes and profiles, calendering.

In the following Examples, parts and percentages are always by weight, unless otherwise indicated.

EXAMPLES

Example 1

11.6 Parts by weight (expressed as solids) of an anionically emulsified polybutadiene latex produced by radical polymerization (latex A) with a $d_{50}$ value of 214 nm, a $d_{90}-d_{10}$ value of 725 nm and a gel content of 59% by weight and 46.4 parts by weight (expressed as solids) of an anionically emulsified polybutadiene latex produced by radical polymerization (latex B) with a $d_{50}$ value of 432 nm, a $d_{90}-d_{10}$ value of 128 nm and a gel content of 81% by weight are adjusted with water to a solids content of around 20% by weight and heated to 64° C., followed by the addition of 0.5 part by weight of potassium peroxodisulfate (dissolved in water). 42 Parts by weight of a mixture of 72% by weight of styrene and 28% by weight of acrylonitrile and 0.1 part by weight of tert.dodecyl mercaptan are then added over a period of 4 h in such a way that 75% by weight of the total quantity of monomer is added to the reaction mixture in the first 2 h. At the same time, 1 part by weight (expressed as solids) of the sodium salt of a resinic acid mixture (Dresinate 731 dissolved in alkalized water) is added over a period of 4 hours. Following an after-reaction time of 4 hours, the graft latex is coagulated with a mixture of magnesium sulfate and acetic acid after the addition of approx. 1.0 part by weight of a phenolic antioxidant and, after washing with water, the resulting powder is dried in vacuo at 70° C.

45 Parts by weight of this graft polymer are mixed in an internal kneader with 55 parts by weight of a styrene/acrylonitrile copolymer resin (72:28, $\overline{M}_w=115,000$, $\overline{M}_w/\overline{M}_n-\leq 2$), 2 parts by weight of ethylenediamine bis-stearylamine and 0.1 part by weight of a silicone oil and the resulting mixture is injection-molded to test specimens and a flat plate (to evaluate surface quality).

The following data were determined: Notched impact strength at room temperature ($a_kRT$) and at $-40°$ C. ($a_k-40°$ C.) in accordance with ISO 180/1A (unit: $kJ/m^2$), ball indentation hardness ($H_c$) in accordance with DIN 53 456 (unit:$N/mm^2$), Vicat softening point (Vicat B) in accordance with DIN 53 460 (unit: °C.), surface gloss in accordance with DIN 67 530 at a reflection angle of 60° (reflectometer value); thermoplastic flow was evaluated by measurement of the necessary filling pressure at 240° C. (unit: bar) (see F. Johannaber, Kunststoffe 74 (1984), 1, pages 2–5).

The results are set out in Table 1.

Example 2

The procedure is as in Example 1 except that a mixture of 23.2 parts by weight (expressed as solids) of latex A and 34.8 parts by weight (expressed as solids) of latex B is used in the graft polymerization reaction.

Example 3

The procedure is as in Example 1, except that a mixture of 29 parts by weight (expressed as solids) of latex A and 29 parts by weight (expressed as solids) of latex B is used in the graft polymerization reaction.

Example 4

The procedure is as in Example 1, except that a mixture of 46.4 parts by weight (expressed as solids) latex A and 11.6 parts by weight (expressed as solids) of latex B is used in the graft polymerization reaction.

Example 5

(Comparison)

The procedure is as in Example 1, except that 58 parts by weight (expressed as solids) of latex A are used in the graft polymerization reaction.

Example 6

(Comparison)

The procedure is as in Example 1, except that 58 parts by weight (expressed as solids) of latex B are used in the graft polymerization reaction.

Example 7

(Comparison)

The procedure is as in Example 1, except that a mixture of 29 parts by weight (expressed as solids) of an anionically emulsified polybutadiene latex produced by radical polymerization with a $d_{50}$ value of 246 nm, a $d_{90}-d_{10}$ value of 155 nm and a gel content of 57% by weight and 29 parts by weight (expressed as solids) of an anionically emulsified polybutadiene latex produced by radical polymerization with a $d_{50}$ value of 430 nm, a $d_{90}-d_{10}$ value of 612 nm and a gel content of 85% by weight are used in the graft polymerization reaction.

Example 8

(Comparison)

The procedure is as in Example 1, except that the monomer mixture is added in such a way that 50% by weight of the total quantity of monomer is added to the reaction mixture in the first 2 h.

Example 9

(Comparison)

The procedure is as in Example 1, except that the monomer mixture is added in such a way that 25% by weight of the total quantity of monomer is added to the reaction mixture in the first 2 h.

The test results set out in Table 1 show that only the molding compounds produced in accordance with the invention combine high toughness at room temperature and at low temperatures with good surface gloss. It is important in this regard that the values for the other technologically important ABS properties, such as hardness, heat resistance and, in particular, thermoplastic flow as a measure of processability, are not adversely affected.

TABLE 1

Test results of the molding compounds tested

| Example | $a_kRT$ (kJ/m²) | $a_k-40°$ C. (kJ/m²) | $H_c$ (N/mm²) | Vicat (°C.) | Filling pressure (bar) | Gloss |
|---|---|---|---|---|---|---|
| 1. | 45 | 28 | 85 | 97 | 208 | 88 |
| 2. | 43 | 26 | 85 | 96 | 194 | 87 |
| 3. | 43 | 26 | 82 | 96 | 195 | 86 |
| 4. | 43 | 26 | 85 | 96 | 194 | 82 |
| 5. (Comparison) | 40 | 23 | 83 | 96 | 183 | 80 |
| 6. (Comparison) | 38 | 24 | 81 | 99 | 195 | 83 |
| 7. (Comparison) | 36 | 21 | 83 | 96 | 198 | 80 |
| 8. (Comparison) | 41 | 25 | 84 | 96 | 196 | 80 |
| 9. (Comparison) | 37 | 22 | 85 | 96 | 198 | 80 |

We claim:
1. An ABS thermoplastic molding compound of:
   a) at least one graft polymer obtained by emulsion polymerization of styrene and acrylonitrile in a ratio by weight of 90:10 to 50:50, the styrene and/or acrylonitrile being completely or partly replaceable by α-methyl styrene, methyl methacrylate or N-phenylmaleimide, in the presence of at least two polybutadiene homopolymer lattices (A) and (B); and b) at least one copolymer of styrene and acrylonitrile in a ratio by weight of 90:10 to 50:50, the styrene and/or acrylonitrile being completely or partly replaceable by α-methyl styrene, methyl methacrylate or N-phenylmaleimide;

wherein the polybutadiene latex (A) has a mean particle diameter $d_{50}$ of $\leq 250$ nm, a width of the particle size distribution (measured as $d_{90}-d_{10}$ from the integral particle size distribution) of 500 to 1000 nm and a gel content of $\leq 70\%$ by weight, the polybutadiene latex (B) has a mean particle diameter $d_{50}$ of $\geq 300$ nm, a width of the particle size distribution (measured as $d_{90}-d_{10}$ from the integral particle size distribution) of 50 to 500 nm and a gel content of $\geq 70\%$ by weight and the graft polymerization is carried out by addition of the monomers to the mixture of polybutadiene lattices (A) and (B) such that 55 to 90% by weight of the monomers are added in the first half of the monomer addition time.

2. An ABS thermoplastic molding compound as claimed in claim 1 wherein the polybutadiene latex (A) has a mean particle diameter $d_{50}$ of 150 to 250 nm, a width of the particle size distribution (measured as $d_{90}-d_{10}$ from the integral particle size distribution) of 700 to 850 nm and a gel content of 50 to 65% by weight, and the polybutadiene latex (B) has a mean particle diameter $d_{50}$ of 350 to 450 nm, a width of the particle size distribution (measured as $d_{90}-d_{10}$ from the integral particle size distribution) of 100 to 400 nm and a gel content of 75 to 90% by weight and wherein the graft polymerization is carried out by addition of the monomers to the mixture of butadiene polymer lattices (A) and (B) such that 60 to 80% by weight of the monomers are added in the first half of the monomer addition time.

3. The ABS thermoplastic molding compound of claim 1, wherein polybutadiene lattice (A) has a gel content of 50–65% by weight and polybutadiene lattice (B) has a gel content of 75–90% by weight.

* * * * *